United States Patent
Miura et al.

(10) Patent No.: US 9,882,519 B2
(45) Date of Patent: Jan. 30, 2018

(54) MOTOR CONTROL APPARATUS AND ELECTRIC POWER STEERING APPARATUS USING THE SAME

(71) Applicant: NSK LTD., Tokyo (JP)

(72) Inventors: Tomohiro Miura, Maebashi (JP); Masahiro Maeda, Maebashi (JP); Yousuke Imamura, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/648,086

(22) PCT Filed: Dec. 19, 2014

(86) PCT No.: PCT/JP2014/083687
§ 371 (c)(1),
(2) Date: May 28, 2015

(87) PCT Pub. No.: WO2016/098244
PCT Pub. Date: Jun. 23, 2016

(65) Prior Publication Data
US 2017/0279394 A1 Sep. 28, 2017

(51) Int. Cl.
*H02P 1/04* (2006.01)
*H02P 23/04* (2006.01)
*H02P 6/08* (2016.01)
*H02P 6/28* (2016.01)
*H02P 6/10* (2006.01)
*B62D 5/04* (2006.01)

(52) U.S. Cl.
CPC .............. *H02P 23/04* (2013.01); *B62D 5/046* (2013.01); *B62D 5/0472* (2013.01); *H02P 6/08* (2013.01); *H02P 6/10* (2013.01); *H02P 6/28* (2016.02)

(58) Field of Classification Search
CPC .. H02P 8/18; H02P 27/08; H02P 9/009; H02P 25/026; H02P 25/089
USPC ...................................... 318/400.17
See application file for complete search history.

(56) References Cited

U.S. PATENT DOCUMENTS

| 2013/0187582 A1 | 7/2013 | Nishimura et al. |
| 2013/0271047 A1 | 10/2013 | Imamura et al. |
| 2014/0225543 A1* | 8/2014 | Maekawa ............. H02P 27/085 318/400.17 |
| 2014/0292241 A1* | 10/2014 | Maekawa ................. H02P 6/18 318/400.17 |

(Continued)

FOREIGN PATENT DOCUMENTS

| JP | 08-237986 A | 9/1996 |
| JP | 2006-033903 A | 2/2006 |
| JP | 2010-279141 A | 12/2010 |

(Continued)

OTHER PUBLICATIONS

Written Opinion of the Interational Searching Authority of PCT/JP2014/083687 dated Mar. 10, 2015.

*Primary Examiner* — Bickey Dhakal
(74) *Attorney, Agent, or Firm* — Sughrue Mion, PLLC

(57) ABSTRACT

A motor control apparatus that calculates duty command values of respective phases for controlling currents of a motor by means of a control calculation, forms PWM-signals in correspondence to the duty command values, drives the motor by means of an inverter based on the PWM-signals, and which is provided a rotation sensor to detect a motor angle of the motor.

15 Claims, 9 Drawing Sheets

(56) References Cited

U.S. PATENT DOCUMENTS

2014/0297131 A1    10/2014  Kashima
2015/0061555 A1*   3/2015   Hamasaki .............. B62D 5/046
                                                    318/400.06

FOREIGN PATENT DOCUMENTS

| JP | 2012-125106 A | 6/2012 |
| JP | 2012-143101 A | 7/2012 |
| JP | 2014-155408 A | 8/2014 |
| JP | 2014-187845 A | 10/2014 |

* cited by examiner

PRIOR ART

PRIOR ART

PRIOR ART

MOTOR CONTROL APPARATUS AND ELECTRIC POWER STEERING APPARATUS USING THE SAME

CROSS REFERENCE TO RELATED APPLICATIONS

This is a National Stage of International Application No. PCT/JP2014/083687 filed Dec. 19, 2014, the contents of which are incorporated herein by reference in its entirety.

TECHNICAL FIELD

The present invention relates to a motor control apparatus that calculates duty command values of respective phases for controlling currents of a motor by means of a control calculation, forms a pulse width modulation (PWM)-signals in correspondence to the duty command values of the respective phases, and drives by applying command currents (voltages) from the inverter to the motor with a PWM control and further to an electric power steering apparatus by means of the motor control apparatus to apply an assist force by the motor to a steering system of a vehicle.

Especially, the present invention relates to a compact, cheap and low noisy motor control apparatus that provides a single current detecting circuit (1-shunt type current detecting circuit) at a power source input side or a power source output side (ground side) of the inverter and PWM-controls, does not use a motor angle signal detected by a rotation sensor at a timing of a duty pattern switching and uses a motor angle estimation signal which is estimated from plural motor angles (stored values) just before the timing, thereby to remove noises and prevent an influence of variations of the motor angle, and further relates to the electric power steering apparatus using the same.

BACKGROUND ART

An electric power steering apparatus which provides a steering mechanism of a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM control.

A general configuration of a conventional electric power steering apparatus will be described with reference to FIG. 1. As shown in FIG. 1, a column shaft (a steering shaft, a handle shaft) 2 connected to a steering wheel (a steering handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a current command value of an assist (steering assist) command based on a steering torque Tr detected by the torque sensor 10 and a vehicle speed Vel detected by a vehicle speed sensor 12, and controls a current supplied to the motor 20 based on a voltage control value E obtained by performing compensation and so on with respect to the current command value. Moreover, it is also possible to receive the vehicle speed Vel from a controller area network (CAN) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque Tr detected by the torque sensor 10 and the vehicle speed Vel from the vehicle speed sensor 12 are inputted into a current command value calculating section 101, and a current command value Iref1 is calculated by means of an assist map and so on. The calculated current command value Iref1 is inputted into a maximum output limiting section 102 and an output is limited based on an overheat protection condition or the like in the maximum output limiting section 102. A current command value Iref2 that a maximum output is limited, is inputted into a subtracting section 103. Moreover, a torque control section is comprised of the current command value calculating section 101 and the maximum output limiting section 102.

The subtracting section 103 calculates a deviation current Iref3(=Iref2−Im) between the current command value Iref2 and a motor current Im of the motor 20 that is fed back, the deviation current Iref3 is controlled by a current control section 104 such as a PI control (proportional and integral control) or the like. Then; the controlled voltage control value E is inputted into a PWM control section 105 and the duty command values are calculated in synchronous with a saw-tooth carrier signal CS, having a predetermined frequency, generated in a carrier signal generating section 107, and in accordance with PWM-signals PS that the duty command values are calculated, the motor 20 is driven through an inverter 106. The motor current Im of the motor 20 is detected by a current detecting circuit 120 within the inverter 106, and the detected motor current Im is inputted into the subtracting section 103 to feed back. In a case that a brushless DC motor as the motor 20 is used for a vector-control, a resolver 21 as a rotation sensor is connected to the motor 20, and an angular speed calculating section 22 for calculating an angular speed ω from a motor angle (rotation angle) θ is provided.

A bridge circuit that bridge-connects semiconductor switching elements (e.g. FETs) and the motor 20 is used in the inverter 106 that controls the motor current Im by means of the voltage control value E and drives the motor 20, and the motor current Im is controlled by performing ON/OFF controls of the semiconductor switching elements in accordance with the duty command values of the PWM-signal determined based on the voltage control value E.

In the case that the motor 20 is a three-phase (U-phase, V-phase and W-phase) brushless DC motor, details of the PWM control section 105 and the inverter 106 is a configuration such as shown in FIG. 3. That is, the PWM control section 105 comprises a duty calculating section 105A that inputs each-phase carrier signal CS and calculates PWM-duty command values D1~D6 of three phases (U-phase, V-phase and W-phase) in accordance with a predetermined expression based on the voltage control value E, and a gate driving section 105B that drives each gate of FET1~FET6 by the PWM-duty command values D1~D6 to turn ON/OFF. The inverter 106 comprises a three-phase bridge having upper/lower arms comprised of a U-phase upper-stage FET1 and a U-phase lower-stage FET4, upper/lower arms comprised of a V-phase upper-stage FET2 and a V-phase lower-stage FET5, and upper/lower arms comprised of a W-phase upper-stage FET3 and a W-phase lower-stage FET6, and drives the motor 20 by being turned ON/OFF with the PWM-duty command values D1~D6. Further, electric power is supplied to the inverter 106 from the battery 13 through a power-source relay 14.

In such a configuration, although it is necessary to measure a drive current of the inverter 106 or the motor current of the motor 20, as one of request items of downsizing, weight saving and cost-cutting of the control unit 100, a singularity of the current detecting circuit 120 is proposed. A 1-shunt type current detecting circuit is known as the singularity of a current detecting circuit, and for example, the configuration of the 1-shunt type current detection circuit 120 is shown in FIG. 4 (for example, Japanese Published Unexamined Patent Application No. 2009-131064 A). Namely, a shunt resistor R1 is connected between the lower-stage arm of the FET bridge and the ground (GND), a fall voltage that is caused by the shunt resistor R1 when a current flowed in the FET bridge is converted into a current value Ima by an operational amplifier (a differential amplification circuit) 121 and resistors R2~R4, and further the current value Ima is A/D-converted at a predetermined timing by an A/D converting section 122 through a filter comprised of a resistor R6 and a capacitor C1, and then a current value Im that is a digital value is outputted. Moreover, a voltage "2.5V" being a reference voltage is connected to a positive input terminal of the operational amplifier 121 through a resistor R5.

In a case that the currents for respective UVW-phases are detected by the 1-shunt type current detecting circuit, for example as disclosed in Japanese Published Unexamined Patent Application No. 2010-279141 A (Patent Document 1), a method that a judgement of the maximum duty, the intermediate duty and the minimum duty is performed and then the judged duties are sequentially arranged with respect to the shifted carrier period, is used. That is, the duty setting values for respective phases are compared, an then the maximum duty, the intermediate duty and the minimum duty are determined, as a reference being a rising phase Y of the carrier signal of the intermediate phase, a rising phase of the carrier signal of the maximum phase is led by a constant amount as well as a rising phase of the carrier signal of the minimum phase is lagged by a constant amount. Whereby the PWM-signals for the respective phases are generated based on the respective-phase carrier signals of which phases are sifted each other and the respective-phase duty setting values, and the current detection is performed in predetermined sections (periods) Tu and Tw till the respective risings of the PWM-signal of the intermediate phase and the PWM-signal of the minimum phase so as to be possible to detect the respective-phase motor currents by the single current detecting circuit.

THE LIST OF PRIOR ART DOCUMENTS

Patent Documents

Patent Document 1: Japanese Published Unexamined Patent Application No. 2010-279141 A Patent Document 2: Japanese Published Unexamined Patent Application No. 2006-33903 A Patent Document 3: Japanese Published Unexamined Patent Application No. 2012-125106 A

SUMMARY OF THE INVENTION

Problems to be Solved by the Invention

In a motor control apparatus disclosed in Patent Document 1, when the order of the maximum phase, the intermediate phase and the minimum phase is the order of U-phase, V-phase and W-phase due to the rotation angle of the motor, the rising timing of PWM rises in order of U, V, W as shown in the carrier periods TC1 and TC2 in FIG. 5. However, a next moment, if the size relation of duties of 3-phases (U, V, W) is changed into "U-phase is maximum", "V-phase is minimum" and "W-phase is intermediate" as shown in the scope of the carrier period TC3 of FIG. 5, the rising timing of PWM also changes such as from "U-phase"→"V-phase"→"W-phase" to "U-phase"→"W-phase"→"V-phase". In accordance with this changing, unintentional duty-variation is temporarily occurred as shown in FIG. 5.

FIG. 6 shows the operations thereof, FIG. 6(A) does an appearance that the phase order of the V-phase duty command value is switched from the intermediate phase to the minimum phase at a time point t1, and FIG. 6(B) does the V-phase current based on the V-phase duty command value and does a matter that a current variation (distortion) due to a temporary duty variation which is generated by switching the phases occurs after the time point t1. Further, FIG. 6(C) shows an appearance that the phase order of the W-phase duty command value is switched from the minimum phase to the intermediate phase at the time point t1, and FIG. 6(D) does the W-phase current based on the W-phase duty command value and does a matter that a current variation (distortion) due to a temporary duty variation which is generated by switching the phases occurs after the time point t1.

As mentioned above, according to the temporary duty variation which is generated by switching the PWM-switch timing of the phase-order of the V-phase and the W-phase at the time point t1, the variations (distortions) are generated in the V-phase current and the W-phase current and the motor current varies as shown in FIG. 6(E). In this way, the motor angle detection value varies as shown in FIG. 6(F) and the current command value to be calculated varies as shown in FIG. 6(G). As a result, the duty command values of UVW-phases vary as shown in FIGS. 6(H)~(J), and therefore the noises occur and the sound and the vibration are generated.

As stated above, the variation of the phase-order due to the PWM phase-shift occurs at a moment of the PWM phase-shift, this variation of the phase-order causes, for example, the variations (distortions) of the V-phase current and the W-phase current and further the current distortion causes the variation of the motor angle. In this connection, the motor angle detection value also varies, the torque control section and the current control section react in sensitive to the variation of the detection value, and the variations of the current command value and the duty command value occur. As a result, a series of a feedback loop that the V-phase current and the W-phase current more vary is formed, and an undesirable phenomenon occurring the noisy sound, the vibration or the like is caused. In the electric power steering apparatus, the occurring of the sound and the vibration gives an uncomfortable feeling to the driver and deteriorates the steering performance.

As a method to lighten the above problems, it is assumed that the variation is suppressed by performing a constant filter-processing in view of taking that the varying motor angle is the noise.

However, as the noise superposed with the rotation (angle) signal of the rotation sensor such as a resolver, a switching noise is generally considered. As the reducing method of the switching noise, it is generally known the method to average the resolver output signal and to lighten the noise as disclosed in Japanese Published Unexamined Patent Application No. 2006-33903 A (Patent Document 2). However, if the filter to remove the step-up noise due to the switching of the PWM-phase as stated above is used, there is a possibility not to accurately reproduce the resolver output signal itself, and further there is a problem to become the steering performance being uncomfortable for the driver in the case of the electric power steering apparatus.

Further, in a control apparatus disclosed in Japanese Published Unexamined Patent Application No. 2012-125106 A (Patent Document 3), the reducing of the angle detection noise due to the switching noise is performed with a correction 1 relating to the rotation speed and a correction 2 relating to the percentage modulation. However, in the apparatus of Patent document 3, since whole signal-processing is performed by utilizing the present value detected by the resolver, there is a problem that the variation of the resolver output signal itself directly influences to the apparatus.

Furthermore, Patent Documents 2 and 3 do not disclose only detection method of the motor current but also consider the downsizing, the weight saving and the cost-cutting.

The present invention has been developed in view of the above-described circumstances, and an object of the present invention is to provide a motor control apparatus that detects a motor current by using a cheap and compact 1-shunt type current detecting circuit, does not occur the variations of the current command value and the duty command values even if the duty variation due to PWM phase-shift occurs at a moment of the PWM phase-shift, and further does not occur an uncomfortable phenomenon such as noisy sound and variation, and to provide an electric power steering apparatus using the same.

Means for Solving the Problems

The present invention relates to a motor control apparatus, the above-described object of the present invention is achieved by that: said motor control apparatus that calculates duty command values of respective phases for controlling currents of a motor by means of a control calculation, forms PWM-signals in correspondence to said duty command values of said respective phase, drives said motor by means of an inverter based on said PWM-signals, and which is provided a rotation sensor to detect a motor angle of said motor: wherein a 1-shunt type current detecting circuit is connected to a power source side or a ground side of said inverter; and comprising; a comparing section to compare said duty command values and to determine a size relation of said duty command values; a timing control section to sequentially enable timings of rising or falling with respect to said PWM-signals with a predetermined order based on said size relation; and a motor angle output section to change an order of said rising in correspondence to a predetermined algorithm, estimate a motor angle estimation value based on past values of said rotation sensor at only a timing when said order of said rising is changed, and output said motor angle estimation value as said motor angle.

Further, the above-described object of the present invention is more effectively achieved by that wherein said predetermined order is an order of a maximum phase, an intermediate phase, a minimum phase of said duty command values, or wherein said predetermined algorithm is an algorithm that said order of said rising is also changed at a timing when a relation of a maximum phase, an intermediate phase and a minimum phase of said respective phases is changed, or wherein said motor angle output section comprising a phase-change detecting section to detect a change of a relation of said maximum phase, said intermediate phase and said minimum phase, a storing section to store a motor angle of said rotation sensor with a predetermined period, and a motor angle estimating section to estimate said motor angle estimation value from plural past values in said storing section, wherein said motor angle estimating section estimates said motor angle estimation value by means of a linear approximation, or wherein said rotation sensor is a resolver.

It is possible to achieve the electric power steering apparatus of the above-described object by mounting each of the above-described motor control apparatuses.

Effects of the Invention

According to the present invention, the motor angle is estimated with a linear approximation by using plural past values in the storing section without using of the motor angle (angle signal) from the rotation sensor (e.g. resolver) at a timing of the PWM phase-shift, and the estimated motor estimation value is used for the control. Therefore, it is possible to minimize or suppress a variation of the motor angle detection value which is one of the feedbacks causing the uncomfortable phenomenon such as the sound and the vibration.

Accordingly, since the current variation (distortion) and the angle variation of the motor due to the PWM phase-switching do not influence to the motor angle detection value, the current command value becomes a smooth command value wave form that the variation of the motor angle detection value does not propagate. As a result, the duty command values are also able to obtain the smooth duty command value wave form that the above variation does not influence. Although the duty command values become the smooth wave form without an influence of the variation of the motor angle detection value, it is possible to reduce or suppress the occurrence of the uncomfortable phenomenon for the motor control apparatus and the electric power steering apparatus.

MODE FOR CARRYING OUT THE INVENTION

In a motor control apparatus (electric power steering apparatus) according to the present invention, a single current detecting circuit (1-shunt type current detecting circuit) is provided between an inverter and a power source or between the inverter and the ground (GND). In order to certainly detect motor currents of respective UVW-phases by using the 1-shunt type current detecting circuit, the maximum duty, an intermediate duty and the minimum duty are determined by comparing the sizes of the duty command values of the respective phases, as a reference being a rising phase of the carrier signal of the intermediate phase, a rising phase of the carrier signal of the maximum phase is led by a constant amount as well as a rising phase of the carrier signal of the minimum phase is lagged by a constant amount, whereby the PWM-signals for the respective phases are generated based on the respective-phase carrier signals of which phases are sifted each other and the respective-phase duty setting values, and the current detection is performed in predetermined sections (periods) till the respective risings of the PWM-signal of the intermediate phase and the PWM-signal of the minimum phase so as to be possible to detect the respective-phase motor currents by the single current detecting circuit.

The present invention detects the switching of the phase-order of duty patterns, does not use a motor angle (angle signal) detected by a resolver or the like only at a timing of a detected phase-order switching and uses a motor angle estimation signal which is estimated from plural stored values (motor angles) just before the timing. Thereby, it is possible to prevent or suppress the variation of the duty command vales due to the variation of the motor angle detection at the timing of the phase-order switching without pass through a special filter. The motor angle detected by the resolver or the like is, as it is, used except for the timing of the phase-order switching of the duty patterns.

Hereinafter, an embodiment of the present invention will be described with reference to the accompanying drawings.

Figure 1:
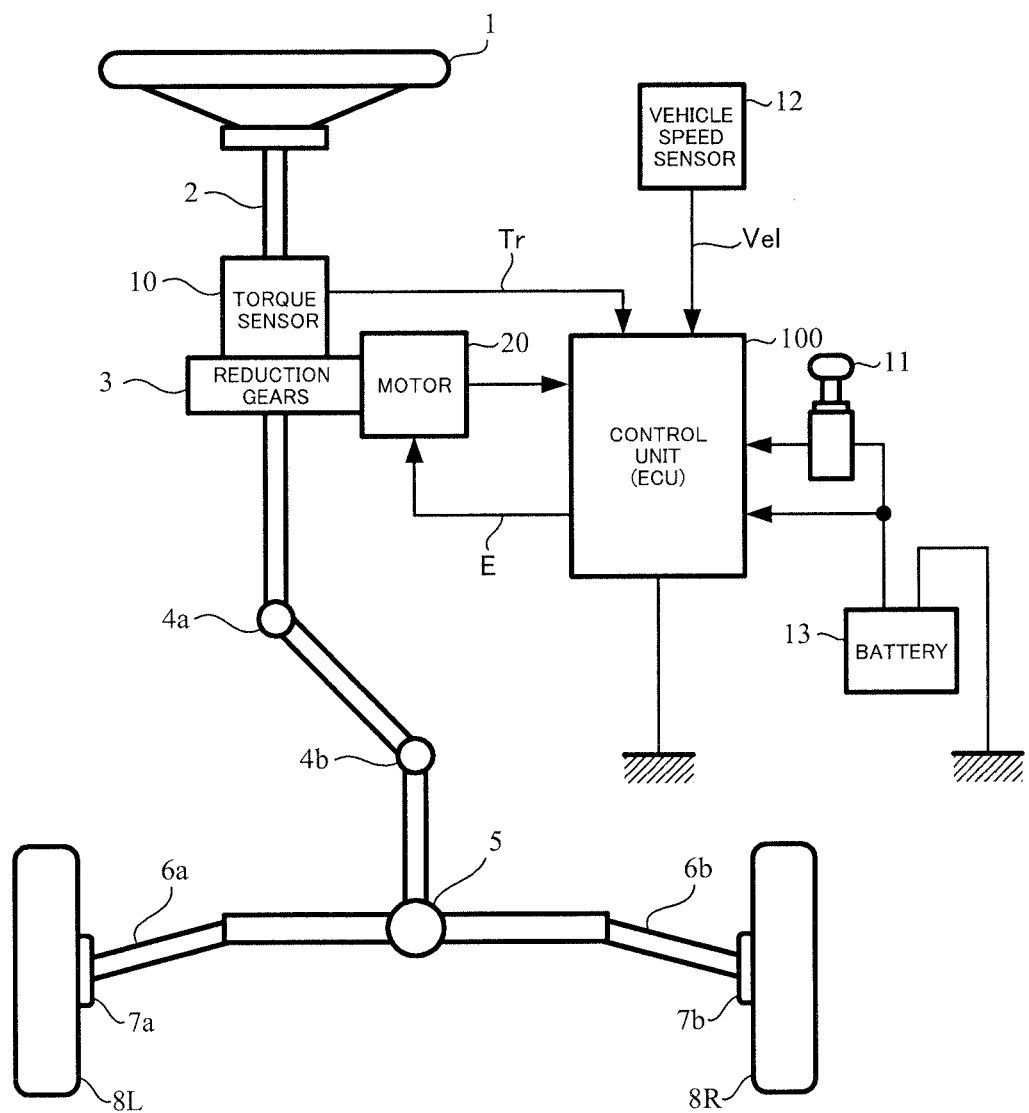
FIG. 1 is a configuration diagram illustrating a general outline of an electric power steering apparatus.
Figure 2:
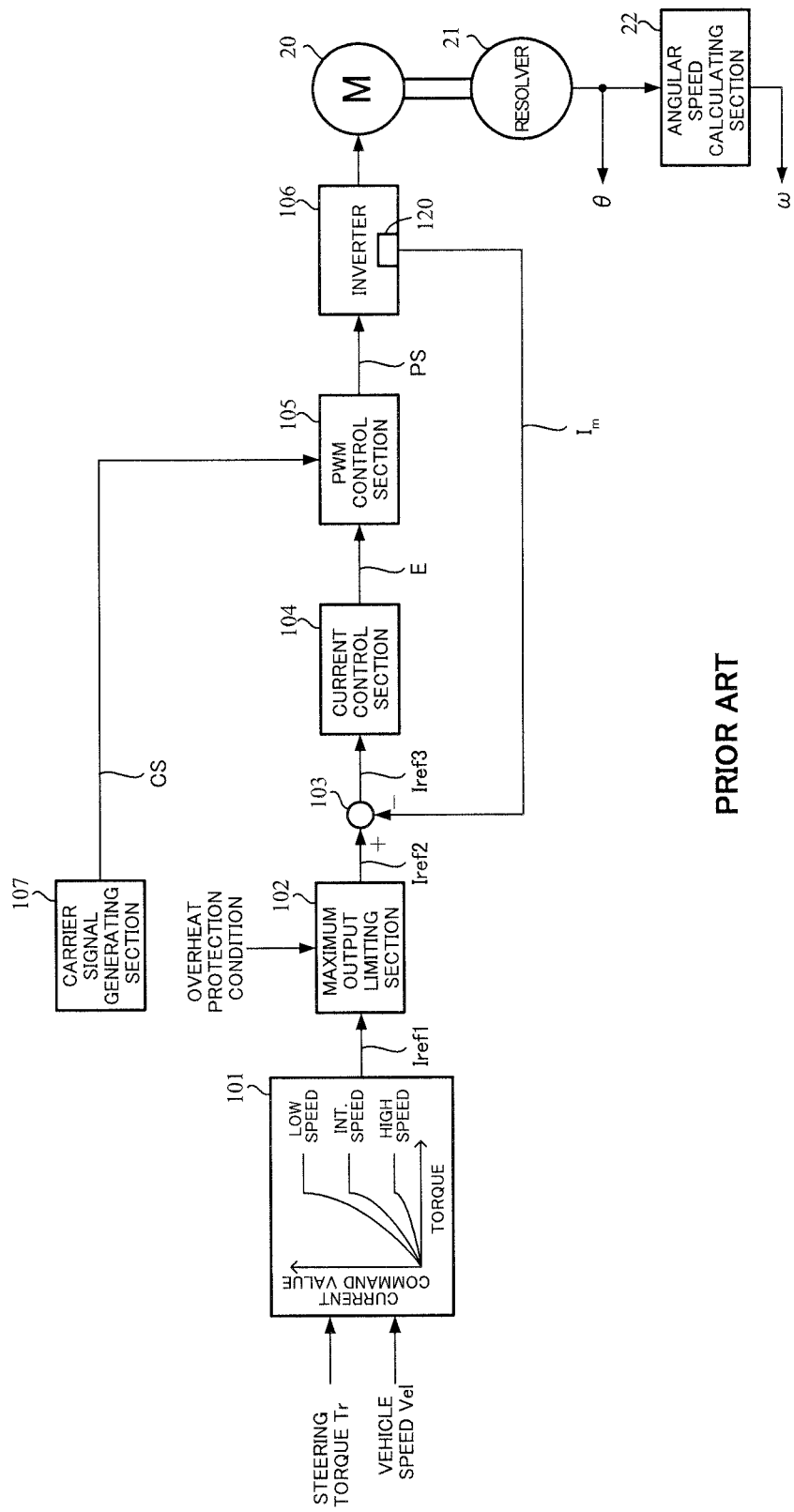
FIG. 2 is a block diagram showing a general configuration example of a control unit.
Figure 3:
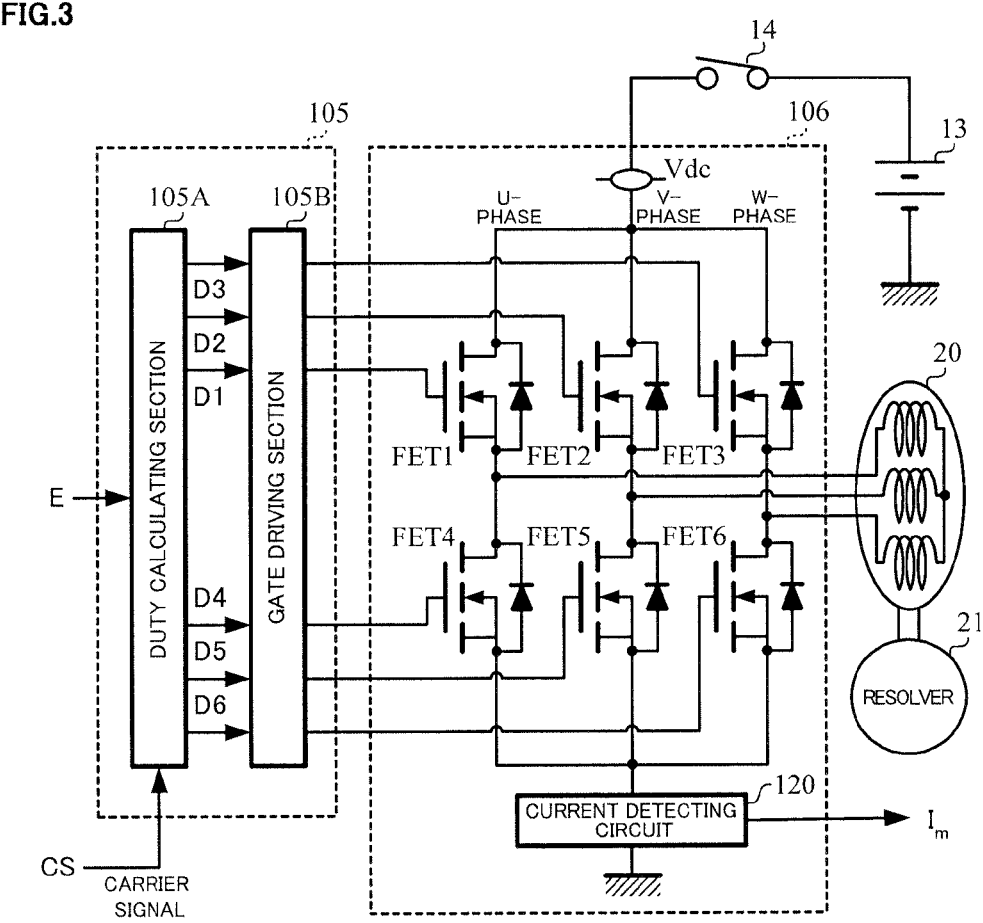
FIG. 3 is a wiring diagram showing a configuration example of a PWM control section and an inverter.
Figure 4:
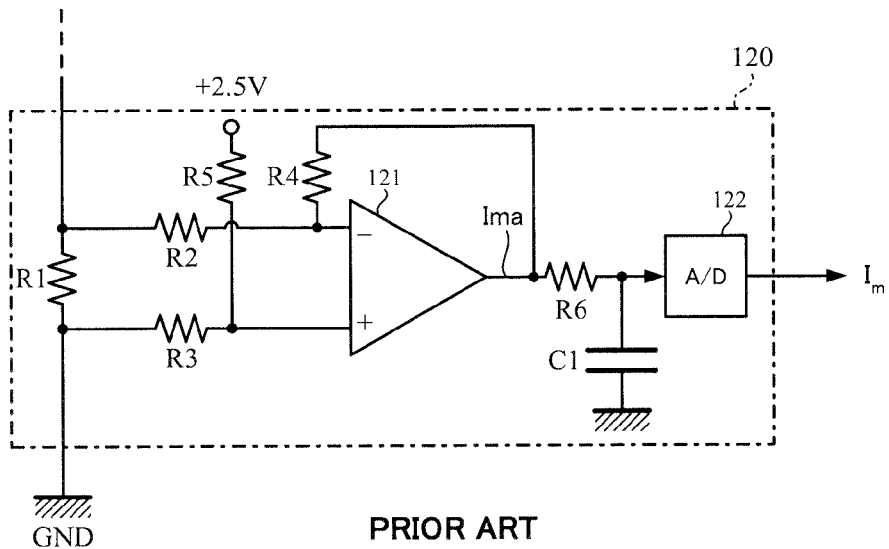
FIG. 4 is a wiring diagram showing a configuration example of a 1-shunt type current detecting circuit.
Figure 5:
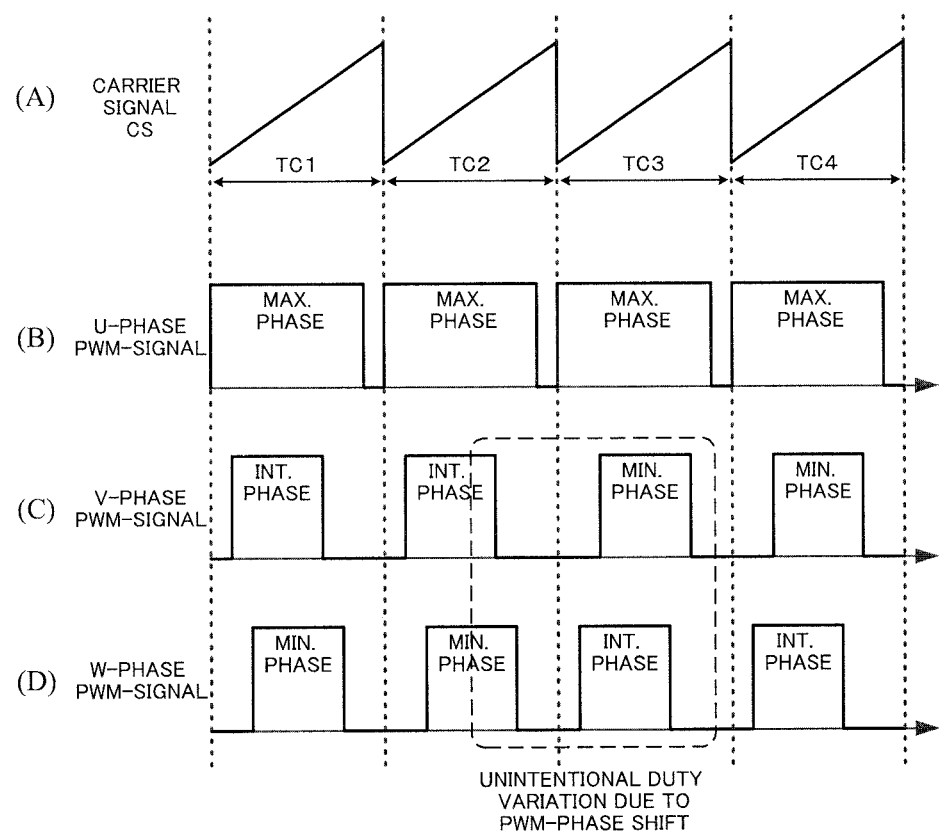
FIG. 5 is a PWM phase diagram showing an operation example to change the phase-order of the PWM phase of the duty command value.
Figure 7:
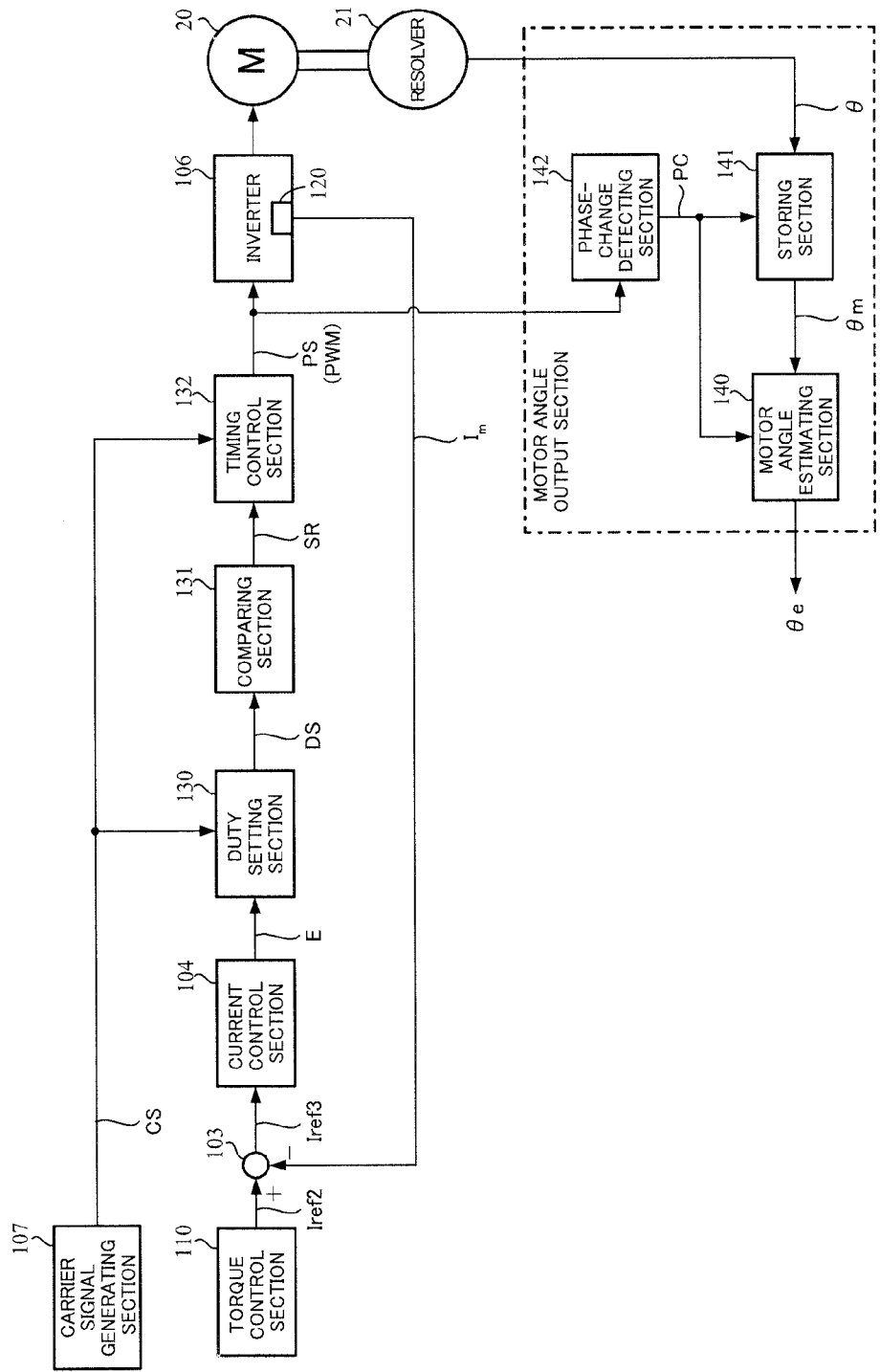
FIG. 7 is a block diagram showing a configuration example of the present invention.

FIG. 7 shows one example of the embodiment of the present invention in correspondence to FIG. 2. As shown in FIG. 7, there are provided a duty setting section 130 to set duty command values DS corresponding to the duties of PWM-signals of respective phases based on the voltage control value E from the current control section 104 and the carrier signal CS; a comparing section 131 to compare the duty command values of respective phases set in the duty setting section 130, determine the maximum phase, the intermediate phase and the minimum phase of the duty command values DS and outputs a size relation signal SR; and a timing control section 132 to raise timings of rising or falling of the PWM-signals of 3-phases at a predetermined order, for example, at an order of "the maximum phase"→"the intermediate phase"→"the minimum phase" of the duty command values based on the size relation signal SR from the comparing section 131 and the carrier signal SR and to output the PWM-signals for driving the motor 20 via the inverter 106.

Further, there are provided a phase-change detecting section 142 to detect an fact that the order of the rising of the 3-phase PWM-signals outputted from the timing control section 132 is changed and to output a phase-change signal PC at the time when the change is occurred; a storing section 141 to store the motor angle θ from the resolver 21 at a predetermined period; and a motor angle estimating section 140 to read out a stored angle data θm of the past plural times from the storing section 141 only at a time when the phase-change signal PC is outputted from the phase-change detecting section 142, estimate the motor angle by means of the linear approximation and output a motor angle estimation value θe.

When the phase-change signal PC is not outputted from the phase-change detecting section 142, the motor angle θ of the resolver 21 is, as it is, outputted as the motor angle estimation signal θe. Namely, when the phase-change signal PC is not outputted, the motor angle estimation signal θe is equal to the motor angle θ. Further, the current command value Iref2 calculated in the torque control section 110 is inputted into the subtracting section 103, and the current command value Iref3 which is a deviation between the current command value Iref2 and the motor current Im detected by the 1-shunt type current detecting circuit 120, is inputted into the current control section 104.

Besides, since the output from the resolver 21 is analogue signal, the storing section 141 actually stores, at a predetermined sampling period, the digital values A/D-converted by an A/D converter or the like as the motor angle θ. Further, a motor angle output section is comprised of the motor angle estimating section 140, the storing section 141 and the phase-change detecting section 142.

Figure 8:
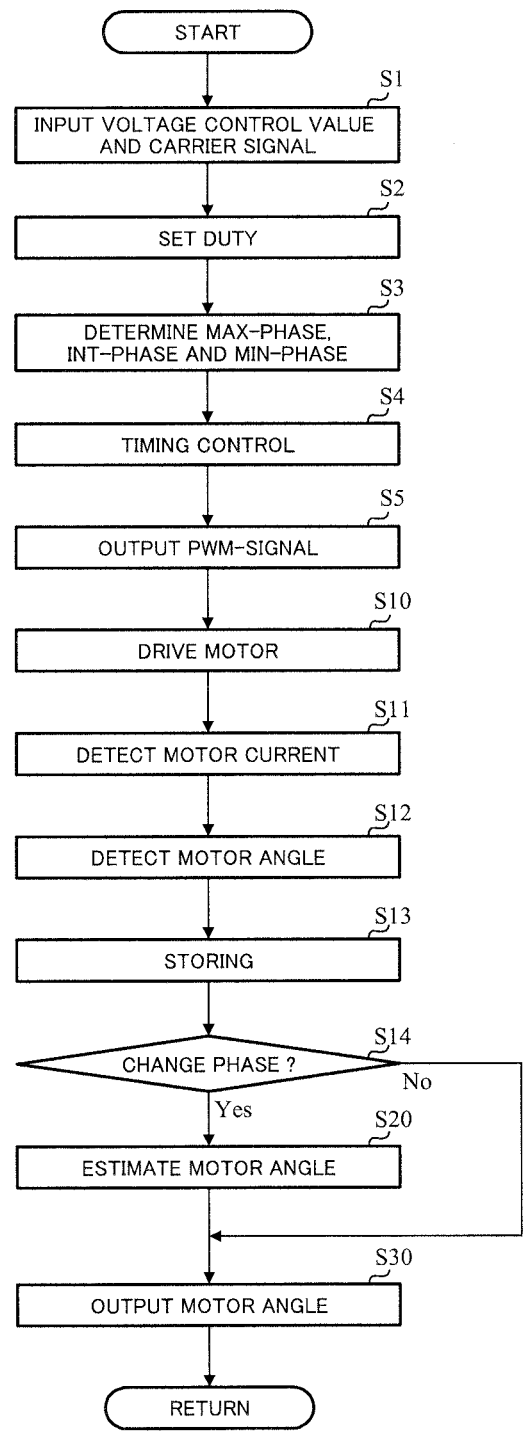
FIG. 8 is a flowchart showing an operation example of the present invention.

In such a configuration, an operation example of the present invention will be described with reference to a flow chart of FIG. 8. The present flow chart of FIG. 8 shows only a part relating to the present invention.

First, the duty setting section 130 inputs the voltage control value E calculated in the current control section 104 and the carrier signal CS generated in the carrier signal generating section 107 (Step S1), and sets the duty command values DS corresponding to the duty of PWM-signals of respective phases (Step S2). The duty command values DS set in the duty setting section 130 are inputted into the comparing section 131, the comparing section 131 compares the duty command values DS of the respective phases, determine the maximum phase, the intermediate phase and the minimum phase of the duty command values DS and outputs the size relation signal SR (Step S3).

The timing control section 132 inputs the size relation signal SR from the comparing section 131, and raises the timings of rising (or falling) of the PWM-signals of 3-phases at the predetermined order (Step S4). The predetermined order is, for example, an order of "the maximum phase"→"the intermediate phase"→"the minimum phase", or an order of "the minimum phase"→"the intermediate phase"→"the maximum phase" or the like. The PWM-signals controlled the timings in the timing control section 132 are outputted (Step S5), and the motor 20 is driven by using the PWM-signals PS via the inverter 106 (Step S10).

The respective phase motor currents of the motor 20 are detected by the 1-shunt type detecting circuit 120 as stated above (Step S11), the detected motor currents Im is fed back to the subtracting section 103. Further, the motor angle θ is detected by the resolver 21 (Step S21), and the detected motor angle θ is stored in the storing section 141 at a predetermined sampling period (Step S13).

On the other hand, the phase-change detecting section 142 detects whether there is a phase-change by changing the order of the rising based on the PWM-signals or not (Step S14), when the phase-change is detected, the phase-change detecting section 142 outputs the phase-change signal PC. The phase change signal PC is inputted into the storing section 141 and the motor angle estimating section 140, the motor angle estimating section 140 reads out plural past motor angles θm just before input of the phase-change signal PC and estimates the motor angle θe by means of the linear approximation based on the plural motor angles θm (Step S20). The estimated motor estimation value θe is outputted from the motor angle estimating section 140 (Step S30). When the phase-change signal PC is not outputted from the phase-change detecting section 142, the motor angle θ of the resolver 21 is, as it is, outputted as the motor angle estimation signal θe (=θ).

Figure 9:
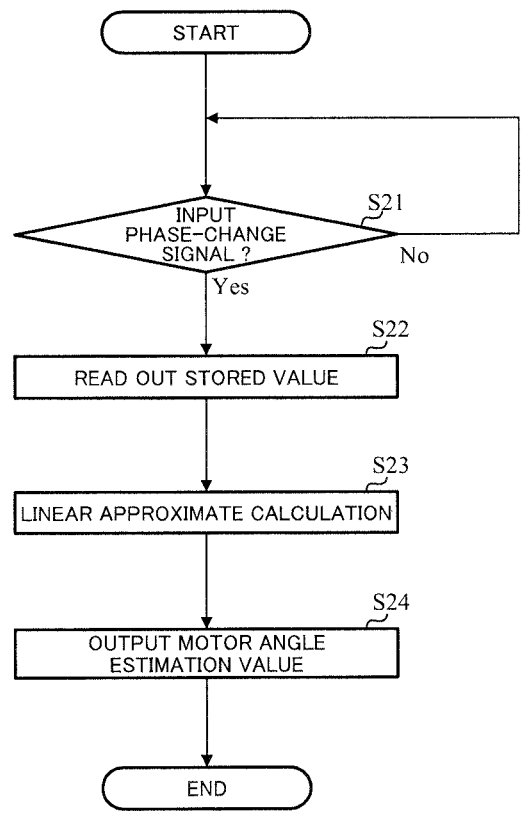
FIG. 9 is a flowchart showing an operation example of a motor angle estimation.

The flow chart of FIG. 9 shows the details of the motor angle estimation at the Step S20, when the phase-change signal PC is inputted from the phase-change detecting section 142 (Step S21), the motor angle estimating section 140 reads out plural past stored values (motor angles θm) from the storing section 141 (Step S22). The motor angle estimating section 140 estimates the motor angle with the known linear approximate calculation by using the plural past stored values (Step S23), and outputs the estimated motor angle estimation value θe (Step S24).

Figure 6:
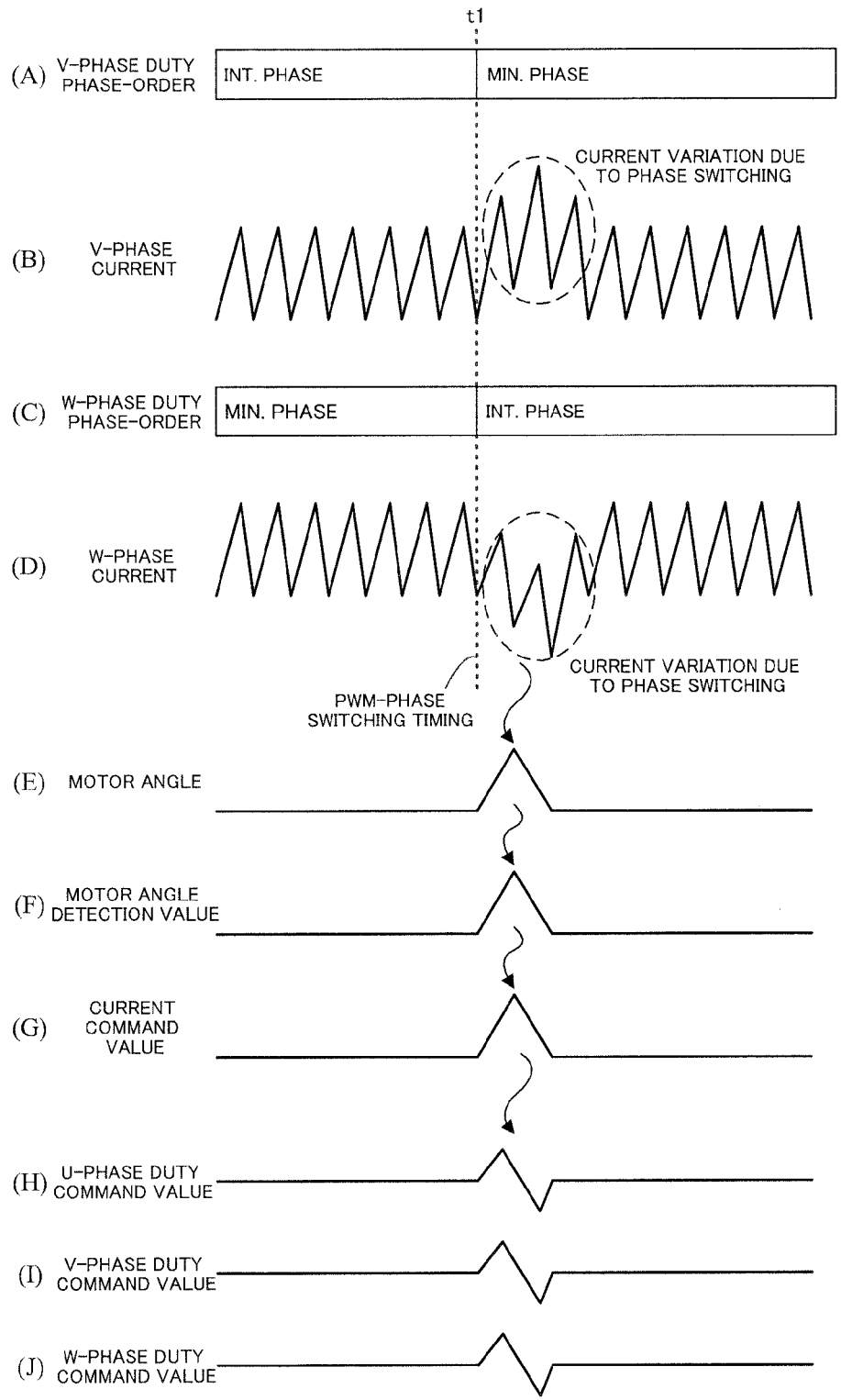
FIG. 6 is a time chart showing an operation example of the conventional apparatus.
Figure 10:
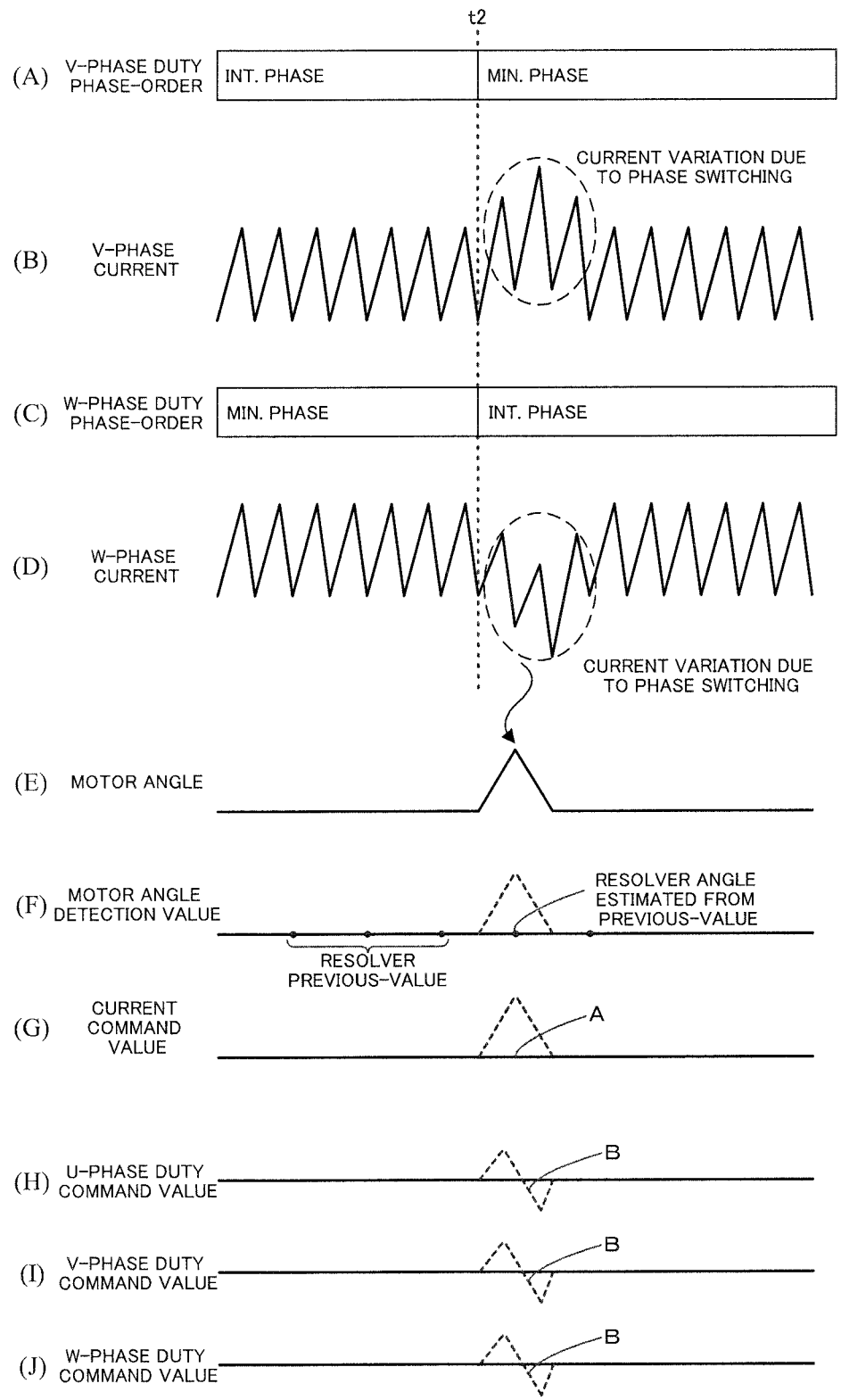
FIG. 10 is a characteristic diagram showing effects of the present invention.

FIG. 10 shows effects of the present invention with reference to FIG. 6. In the present invention, even if the motor angle θ varies due to the phase-change as shown in FIG. 10.(E), when the phase-change occurs as shown in FIGS. 10(A) and (C), the motor angle estimating section 140 estimates the motor angle as shown in FIG. 10(F) by means of the linear approximation, a logarithmic approximation and so on from the past values θm of the motor angle θ based on the phase-change signal PC detected by the phase-change detecting section 142. Then, the estimated motor angle estimation value θe is used for the control calculation. Consequently, as shown in FIGS. 10(G)~(J), variations in the current command value and the duty command values do not occur, and it is possible to output smooth current command value and the duty command values.

EXPLANATION OF REFERENCE NUMERALS 1 steering handle (steering wheel)
10 torque sensor
12 vehicle speed sensor
13 battery
20 motor
21 resolver
22 angular speed calculating section
100 control unit (ECU)
101. current command value calculating section
102 maximum output limiting section
104 current control section
105 PWM control section
105A duty calculating section
105B gate driving section
106 inverter
107 carrier signal generating section
120 1-shunt type current detecting circuit
130 duty setting section
131 comparing section
132 timing control section
140 motor angle estimating section
141 storing section
142 phase-change detecting section

The invention claimed is:

1. A motor control apparatus that calculates duty command values of respective phases for controlling currents of a motor forms PWM-signals in correspondence to said duty command values of said respective phase, drives said motor by means of an inverter based on said PWM-signals, and inputs a motor angle from a rotation sensor to detect said motor angle of said motor:
    wherein a 1-shunt type current detecting circuit is connected to a power source side or a ground side of said inverter; and comprising;
        a comparing section to compare said duty command values and determine a size relation of said duty command values;
        a timing control section to sequentially enable timings of rising or falling with respect to said PWM-signals with a predetermined order based on said size relation; and
        a motor angle output section to detect a change of an order of said rising in correspondence to a predetermined algorithm, to output said motor angle from said rotation sensor when said predetermined order of said rising is not changed, and to estimate a motor angle estimation value based on past motor angles of said rotation sensor and output said motor angle estimation value as said motor angle when said predetermined order of said rising is changed,
    wherein said motor is drive-controlled by means of an output signal from said motor angle output section.

2. The motor control apparatus according to claim 1, wherein said predetermined order is an order of a maximum phase, an intermediate phase, a minimum phase of said duty command values.

3. The motor control apparatus according to claim 2, wherein said predetermined algorithm is an algorithm that said order of said rising is also changed at a timing when a relation of said maximum phase, said intermediate phase and said minimum phase of said respective phases is changed.

4. An electric power steering apparatus provided with said motor control apparatus according to claim 3.

5. The motor control apparatus according to claim 2, wherein said motor angle output section comprising a phase-change detecting section to detect a change of a relation of said maximum phase, said intermediate phase and said minimum phase, a storing section to store a motor angle of said rotation sensor with a predetermined period, and a motor angle estimating section to estimate said motor angle estimation value from plural past values in said storing section.

6. The motor control apparatus according to claim 5, wherein said motor angle estimating section estimates said motor angle estimation value by means of a linear approximation or a logarithmic approximation.

7. An electric power steering apparatus provided with said motor control apparatus to claim 2.

8. The motor control apparatus according to claim 1, wherein said predetermined algorithm is an algorithm that said order of said rising is also changed at a timing when a relation of a maximum phase, an intermediate phase and a minimum phase of said respective phases is changed.

9. The motor control apparatus according to claim 8, wherein said motor angle output section comprising a phase-change detecting section to detect a change of a relation of said maximum phase, said intermediate phase and said minimum phase, a storing section to store a motor angle of said rotation sensor with a predetermined period, and a motor angle estimating section to estimate said motor angle estimation value from plural past values in said storing section.

10. The A motor control apparatus according to claim 9, wherein said motor angle estimating section estimates said motor angle estimation value by means of a linear approximation or a logarithmic approximation.

11. An electric power steering apparatus provided with said motor control apparatus according to claim 8.

12. The motor control apparatus according to claim 1, wherein said motor angle output section comprising a phase-change detecting section to detect a change of a size relation of respective phase duty command values of a maximum phase, an intermediate phase and a minimum phase, a storing section to store said motor angle of said rotation sensor at a predetermined period, and a motor angle estimating section to estimate said motor angle estimation value from plural past values in said storing section.

13. The motor control apparatus according to claim 12, wherein said motor angle estimating section estimates said motor angle estimation value by means of a linear approximation or a logarithmic approximation.

14. The motor control apparatus according to claim 1, wherein said rotation sensor is a resolver.

15. An electric power steering apparatus provided with said motor control apparatus to claim 1.

* * * * *